(12) United States Patent
Chen et al.

(10) Patent No.: US 7,667,683 B2
(45) Date of Patent: Feb. 23, 2010

(54) LIGHT SOURCE DRIVING MODULE AND CIRCUIT

(75) Inventors: Chien-Yang Chen, Taipei (TW);
Chi-Hsiu Lin, Yun-Lin Hsien (TW);
Shin-Chang Lin, Taipei Hsien (TW);
Po-Kun Hsieh, Taoyuan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 71 days.

(21) Appl. No.: 12/188,202

(22) Filed: Aug. 7, 2008

(65) Prior Publication Data

US 2009/0212716 A1 Aug. 27, 2009

(30) Foreign Application Priority Data

Feb. 21, 2008 (TW) ............... 97106099 A (51) Int. Cl.
*G09G 3/36* (2006.01)
(52) U.S. Cl. ......................... 345/102; 345/82
(58) Field of Classification Search ................ 345/102, 345/82, 76, 87
See application file for complete search history.

(56) References Cited

U.S. PATENT DOCUMENTS

| | | | | |
|---|---|---|---|---|
| 6,807,430 B2 * | 10/2004 | Woods et al. | ............ | 455/550.1 |
| 7,605,809 B2 * | 10/2009 | Wey et al. | .................... | 345/212 |
| 7,615,974 B1 * | 11/2009 | Xu | ............... | 323/271 |
| 2006/0175986 A1 | 8/2006 | Lee et al. | | |
| 2007/0171271 A1 * | 7/2007 | Wey et al. | .................... | 347/237 |
| 2007/0229446 A1 * | 10/2007 | Oh et al. | ..................... | 345/102 |
| 2007/0279335 A1 * | 12/2007 | Lin et al. | ....................... | 345/76 |
| 2008/0157699 A1 * | 7/2008 | Lee et al. | .................... | 315/294 |
| 2008/0231621 A1 * | 9/2008 | Chang et al. | ................ | 345/211 |

* cited by examiner

*Primary Examiner*—Ricardo L Osorio
(74) *Attorney, Agent, or Firm*—Winston Hsu (57) ABSTRACT

A light source driving circuit includes a voltage signal source and a temperature-improving current source for adjusting luminance of a series of LEDs. A first end of the series of LEDs is electrically connected to a ground end. The temperature-improving current source includes an adjustable power supply for outputting an adjustable voltage, a voltage-controlled current source for outputting currents according to the voltage signal source, and a feedback circuit electrically connected between a second end of the series of the LEDs and the adjustable power supply for controlling the output voltage of the adjustable power supply according to the voltage on the second end of the series of LEDs.

26 Claims, 6 Drawing Sheets

LIGHT SOURCE DRIVING MODULE AND CIRCUIT

BACKGROUND OF THE INVENTION

1. Field of the Invention

The present invention relates to a light source driving circuit and module thereof, and more particularly, to a light source driving circuit and module thereof providing a fixed current with reduced temperature dependence.

2. Description of the Prior Art

Applications of light sources utilizing Light Emitting Diodes (LEDs) are more and more common. For example, the back light module of the conventional Liquid Crystal Display (LCD) utilizes a Cold Cathode Fluorescent Lamp (CCFL) as the light source. Nowadays, as efficiency of the LED increases and cost of manufacture decreases, the LED is gradually replacing the CCFL as the light source of the back light module of the LCD.

In a conventional application, a plurality of the LEDs are electrically connected in series for reducing the amount of driving circuits needed and the amount of total driving current. However, due to differences between different manufactures, it is not easy to ensure that parameters of the LEDs (e.g. forward voltage) from different manufactures will be the same. Besides, environmental factors, such as temperature, may affect parameters of the LEDs. For example, as the temperature rises, the forward voltage of the LED falls, so that the size of the current flowing through the LED changes. Since the brightness of the LED is proportional to the current flowing through the LED, when the size of the current flowing through the LED changes, the brightness of the LED changes as well. Therefore, when the temperature rises, the brightness of a plurality of LEDs electrically connected in series also changes. Additionally, a total forward voltage error of a structure of a plurality of LEDs electrically connected in series is equivalent to the sum of the forward voltage error of each LED of the plurality of the LEDs electrically connected in series, and the total forward voltage error differs over different series of LEDs.

Therefore, even if two different series of LEDs are driven with one same voltage, the sizes of the currents respectively flowing through each series of LEDs are different, since there is difference between the total forward voltage errors of the two series of LEDs. The difference between the total forward voltage errors of the two series of LEDs is further increased when the difference between the temperatures in the two series of LEDs increases. In this way, difference between the brightness's of the two series of LEDs is generated. Thus, brightness of an LCD back light module utilizing series of LEDs is easily unbalanced, resulting in Mura on the LCD.

SUMMARY OF THE INVENTION

The present invention provides a light source driving circuit for driving a series of Light Emitting Diodes (LEDs). A first end of the series of LEDs is electrically connected to a ground end. The light source driving circuit comprises a voltage signal source; a voltage-controlled current source comprising a first amplifier comprising a positive input end electrically connected to the voltage signal source; a negative input end; and an output end; a first Bipolar Junction Transistor (BJT), comprising an emitter, electrically connected to the negative input end of the first amplifier; a base, electrically connected to the output end of the first amplifier; and a collector; a first resistor, electrically connected between the negative input end of the first amplifier and the ground end; a second amplifier comprising a positive input end, electrically connected to the collector of the first BJT; a negative input end; and an output end; a second resistor, electrically connected between the collector of the first BJT and a biasing source; a third resistor, electrically connected between the negative input end of the second amplifier and the biasing source; and a second BJT comprising an emitter, electrically connected to the negative end of the second amplifier; a base, electrically connected to the output end of the second amplifier; and a collector, electrically connected to a second end of the series of LEDs.

The present invention further provides a light source driving module for driving an array of LEDs. The array of LEDs have K series of LEDs. K is a positive integer. A first end of each series of LEDs is electrically connected to a ground end. The light source driving module comprises a voltage signal source; K voltage-controlled current sources, each of the K voltage-controlled current sources comprising a first amplifier comprising a positive input end, electrically connected to the voltage signal source; a negative input end; and an output end; a first BJT comprising an emitter, electrically connected to the negative input end of the first amplifier; a base, electrically connected to the output end of the first amplifier; and a collector; a first resistor, electrically connected between the negative end of the first amplifier and the ground end; a second amplifier comprising a positive input end, electrically connected to the collector of the first BJT; a negative input end; and an output end; a second resistor, electrically connected between the collector of the first BJT and a biasing source; a third resistor, electrically connected between the negative input end of the second amplifier and the biasing source; and a second BJT comprising an emitter, electrically connected to the negative input end of the second amplifier; a base, electrically connected to the output end of the second amplifier; and a collector, electrically connected to a second end of a corresponding series of the LEDs.

The present invention further provides a light source driving circuit for driving a series of LEDs. A first end of the series of LEDs is electrically connected to a ground end. The light source driving circuit comprises a voltage signal source; a current source comprising an adjustable biasing source; a voltage-controlled current source, comprising a first amplifier comprising a positive input end, electrically connected to the voltage signal source; a negative input end; and an output end; a first BJT comprising an emitter, electrically connected to the negative input end of the first amplifier; a base, electrically connected to the output end of the first amplifier; and a collector; a first resistor, electrically connected between the negative input end of the first amplifier and the ground end; a second amplifier comprising a positive input end, electrically connected to the collector of the first BJT; a negative input end; and an output end; a second resistor, electrically connected between the collector of the first BJT and the adjustable biasing source; a third resistor, electrically connected between the negative input end of the second amplifier and the adjustable biasing source; a second BJT comprising an emitter, electrically connected to the negative input end of the second amplifier; a base, electrically connected to the output end of the second amplifier; and a collector, electrically connected to a second end of the series of the LEDs; and a feedback circuit, electrically connected between the second end of the series of the LEDs and the adjustable biasing source for controlling level of an output voltage of the adjustable biasing source according to a voltage on the second end of the series of LEDs.

The present invention further provides a light source driving module for driving an array of LEDs. The array of LEDs have K series of LEDs. K is a positive integer. A first end of each series of the LEDs is electrically connected to a ground end. The light source driving module comprises a voltage signal source; K current sources, each of the K current sources comprising an adjustable biasing source; a voltage-controlled current source comprising a first amplifier comprising a positive input end, electrically connected to the voltage signal source; a negative input end; and an output end; a first BJT comprising an emitter, electrically connected to the negative input end of the first amplifier; a base, electrically connected to the output end of the first amplifier; and a collector; a first resistor, electrically connected between the negative input end of the first amplifier and the ground end; a second amplifier comprising a positive input end, electrically connected to the collector of the first BJT; a negative input end; and an output end; a second resistor, electrically connected between the collector of the first BJT and the adjustable biasing source; a third resistor, electrically connected between the negative input end of the second amplifier and the adjustable biasing source; a second BJT comprising an emitter, electrically connected to the negative input end of the second amplifier; a base, electrically connected to the output end of the second amplifier; and a collector, electrically connected to a second end of the corresponding series of the LEDs; and a feedback circuit, electrically connected between the second end of the corresponding series of the LEDs and the adjustable biasing source for controlling level of an output voltage of the adjustable biasing source according to a voltage on the second end of the corresponding series of LEDs.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
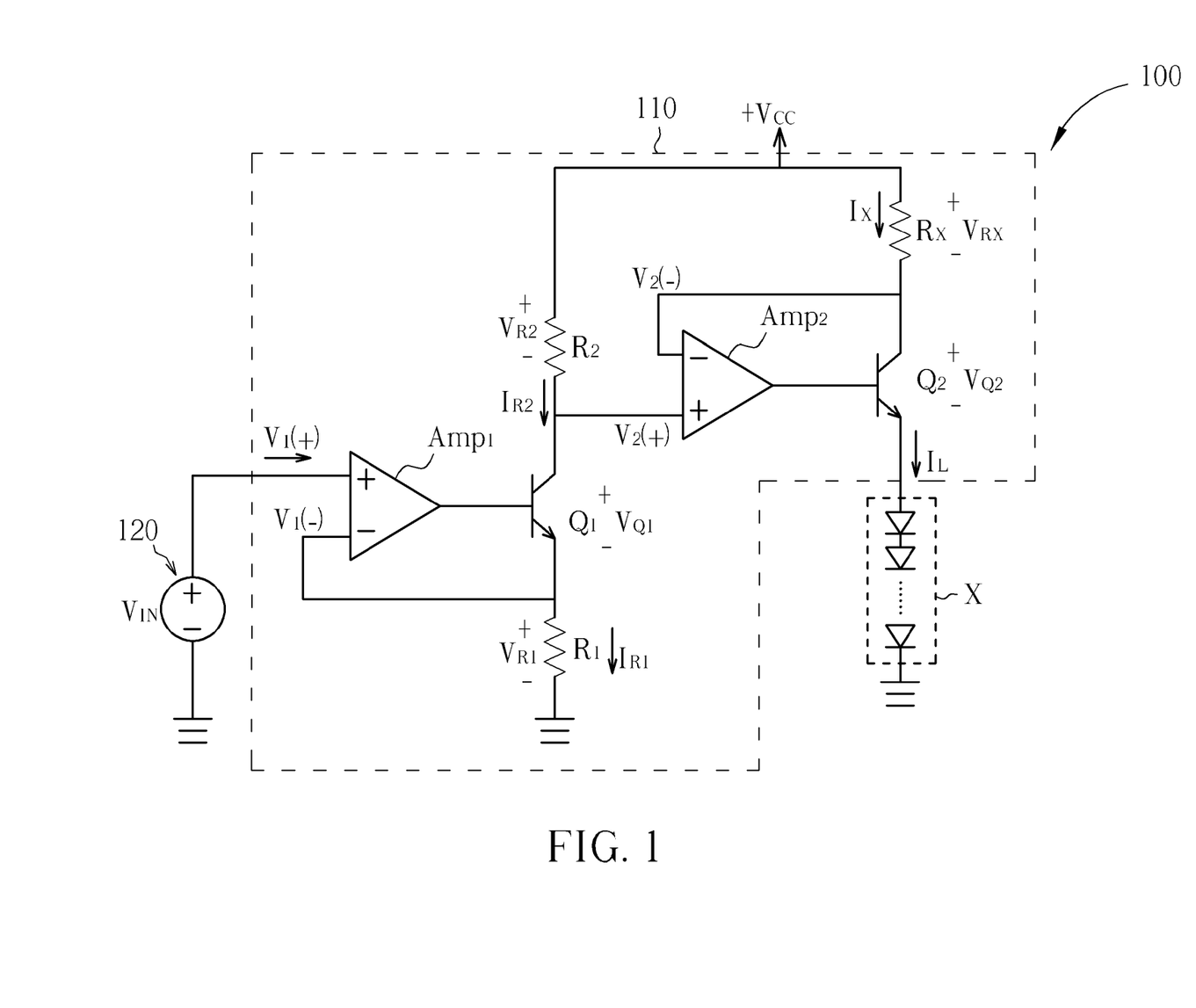
FIG. 1 is a first embodiment of a light source driving circuit according to the light source driving circuit of the present invention.

Please refer to FIG. 1. FIG. 1 is a first embodiment of a light source driving circuit 100 according to the light source driving circuit of the present invention. As shown in FIG. 1, the light source driving circuit 100 comprises a voltage-controlled current source 110 and a voltage signal source 120. The voltage signal source 120 provides a voltage $V_{IN}$ to control the voltage-controlled current source 110 for generating a current $I_L$. The current $I_L$ is utilized to drive an LED series X comprising a plurality of LEDs electrically connected in series. The amount of the current $I_L$ is unrelated to the impedance of the LED series X but is related to the voltage $V_{IN}$. Thus, the light source driving circuit 100 controls the amount of the current $I_L$ for controlling the brightness of the LED series X according to the voltage $V_{IN}$ generated by the voltage signal source 120.

Please continue referring to FIG. 1. The voltage-controlled current source 110 comprises two amplifiers $Amp_1$ and $Amp_2$, two Bipolar Junction Transistors (BJTs) $Q_1$ and $Q_2$, and three resistors $R_1$, $R_2$, and $R_X$. The amplifier $Amp_1$ comprises a positive input end electrically connected to the voltage signal source 120, a negative input end electrically connected to the emitter of the BJT $Q_1$, and an output end electrically connected to the base of the BJT $Q_1$. One end of the resistor $R_1$ is electrically connected to the emitter of the BJT $Q_1$, and the other end of the resistor $R_1$ is electrically connected to a ground end. One end of the resistor $R_2$ is electrically connected to the collector of the BJT $Q_1$, and the other end of the resistor $R_2$ is electrically connected to the voltage source $V_{CC}$ (supplying a voltage $V_{CC}$). The amplifier $Amp_2$ comprises a positive input end electrically connected to the collector of the BJT $Q_1$, a negative input end electrically connected to the emitter of the BJT $Q_2$, and an output end electrically connected to the base of the BJT $Q_2$. One end of the resistor $R_X$ is electrically connected to the emitter of the BJT $Q_2$, and the other end of the resistor $R_X$ is electrically connected to the voltage source $V_{CC}$. The collector of the BJT $Q_2$ is electrically connected to the LED series X for providing the current $I_L$ to the LED series X.

The operation of the light source driving circuit 100 is described as follows. Since the positive input end and the negative input end of the amplifier $Amp_1$ are virtually short-circuited to each other, and the positive input end and the negative input end of the amplifier $Amp_2$ are virtually short-circuited to each other, the voltages respectively on the positive input end and the negative input end of the amplifier $Amp_1$ are the same $[V_1(+)=V_1(-)]$, and the voltages respectively on the positive input end and the negative input end of the amplifier $Amp_2$ are the same $[V_2(+)=V_2(-)]$. The positive input end of the amplifier $Amp_1$ is electrically connected to the voltage signal source 120, and thus the voltage on the positive input end of the amplifier $Amp_1$ is equal to the voltage $V_{IN}$. Therefore, the voltage across the resistor $R_1$ equals $V_{IN}$ ($V_{R1}=V_{IN}$). The voltage across the resistor $R_X$ equals the voltage across the resistor $R_2$ ($V_{RX}=V_{R2}$). Because the input impedances of the amplifiers $Amp_1$ and $Amp_2$ are equivalently infinite, the currents inputted to the amplifiers $Amp_1$ and $Amp_2$ are equivalently equal to zero. Thus, the current on the emitter of the BJT $Q_1$ equivalently equals the current $I_{R1}$ flowing through the resistor $R_1$. Since the voltage across the resistor $R_1$ ($V_{R1}$) equals the voltage $V_{IN}$, the current on the emitter of the BJT $Q_1$ equals $V_{IN}/R_1$. Because the current on the base of the BJT $Q_1$ is very small and can be ignored, the current flowing through the resistor R2 is equivalent to $V_{IN}/R_1$. Because the resistors $R_2$ and $R_X$ are respectively coupled between the voltage source $V_{CC}$ and the positive input end of the amplifier $Amp_2$ and between the voltage source $V_{CC}$ and the negative input end of the amplifier $Amp_2$, and the positive input end and the negative input end of the amplifier $Amp_2$ are virtually short-circuited, and the voltage across the resistor $R_X$ ($V_{RX}$) is equal to the voltage across the resistor $R_2$ ($V_{R2}$). Therefore, the current flowing through the resistor $R_X$ ($I_X$) is calculated to be $V_{IN}/R_X$ ($I_X=R_2\times(V_{IN}/R_X)/R_X$). Under the condition that the resistances of the resistors $R_1$ and $R_2$ are the same, the current $I_X$ equals $V_{IN}/R_X$ ($I_X=V_{IN}/R_X$). Because the current on the emitter of the BJT Q2 equals the current $I_X$ (since the input impedance of the amplifier $Amp_2$ is infinite), and the current on the base of the BJT $Q_2$ is very small and can be ignored, the current on the collector of the BJT $Q_2$ ($I_L$) equals the current on the emitter of the BJT $Q_2$ ($I_X$) ($I_X=I_L$). Therefore, the load current $I_L$ of the LED series X equals $V_{IN}/R_X$ ($I_L=V_{IN}/R_X$). That is, the load current $I_L$ of the LED series X is unrelated to the impedance of the LED series X, and only related to the input voltage $V_{IN}$ and the resistor $R_X$. When the resistor $R_X$ is set to a fixed value, the load current $I_L$ is only related to the voltage $V_{IN}$, which is easy to control. Thus, according to the light source driving circuit 100, the amount of the load current $I_L$ can be controlled by the voltage $V_{IN}$ and the brightness of the LED series X can be controlled by the load current $I_L$.

Figure 2:
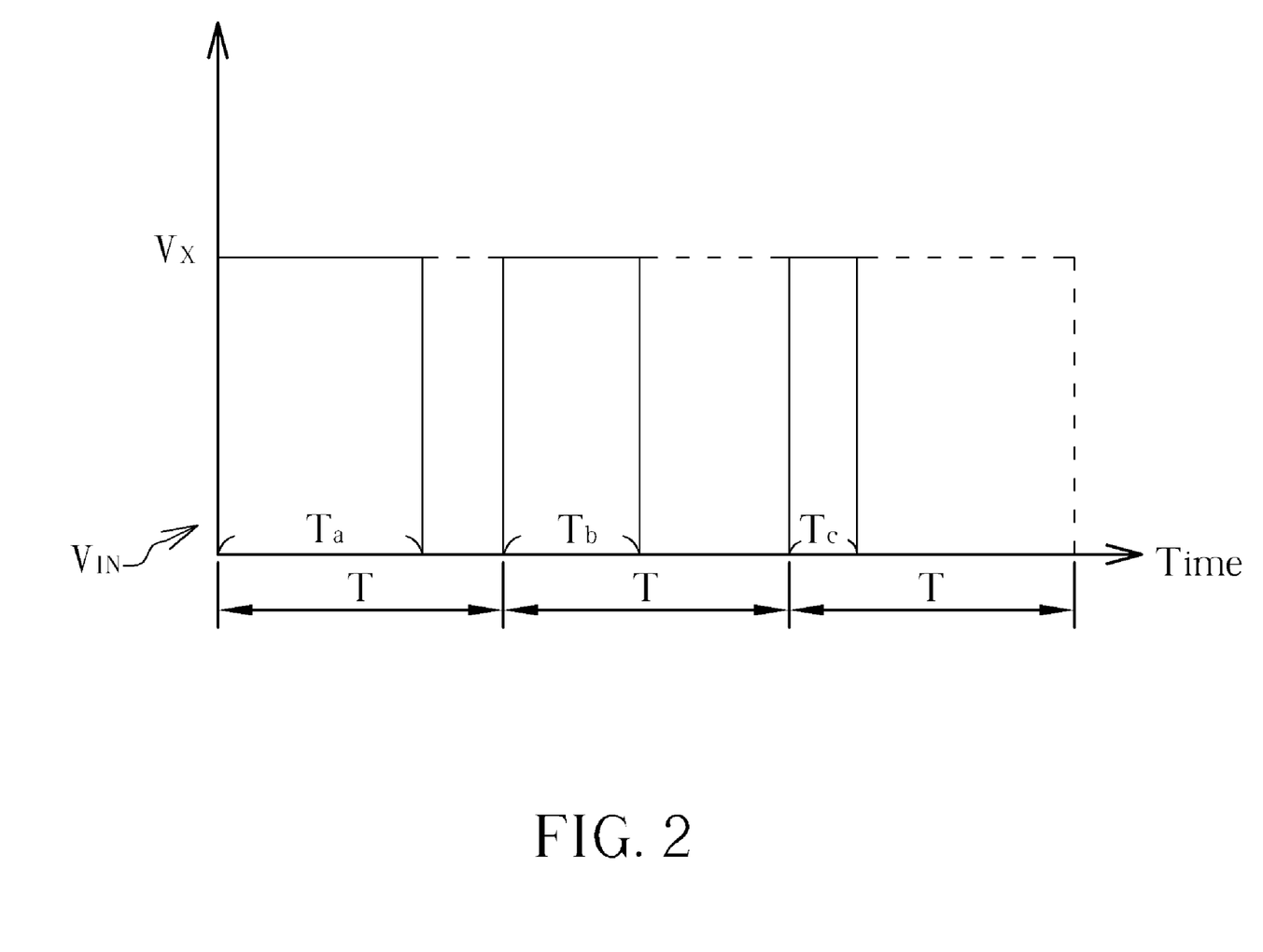
FIG. 2 is a diagram illustrating the voltage of the voltage signal source according to a first embodiment of the present invention.

Please refer to FIG. 2. FIG. 2 is a diagram illustrating the voltage $V_{IN}$ of the voltage signal source 120 according to a first embodiment of the present invention. As shown in FIG. 2, the voltage $V_{IN}$ from the voltage signal source 120, can be a Pulse Width Modulation (PWM) signal with adjustable duty ratio. More particularly, the period cycle of the PWM signal is T, the voltage of the PWM signal is $V_X$ in an "ON" state, the voltage of the PWM signal is 0 in an "OFF" state, and the width of the "ON" state of the PWM signal is adjustable. The duration of the "ON" state of the PWM signal can be Ta, Tb, or Tc, which is designed as desired. When duration of the "ON" state is set to a longer period (for example, Ta), the brightness of the LED series X is higher. When duration of the "ON" state is set to a shorter period (for example, Tc), the brightness of the LED series X is lower. As long as the period cycle T of the voltage signal is longer than 1/16 second, the human eye will not detect a flicker phenomenon from the LED series X. In this way, the brightness of the LED series X is effectively controlled.

Figure 3:
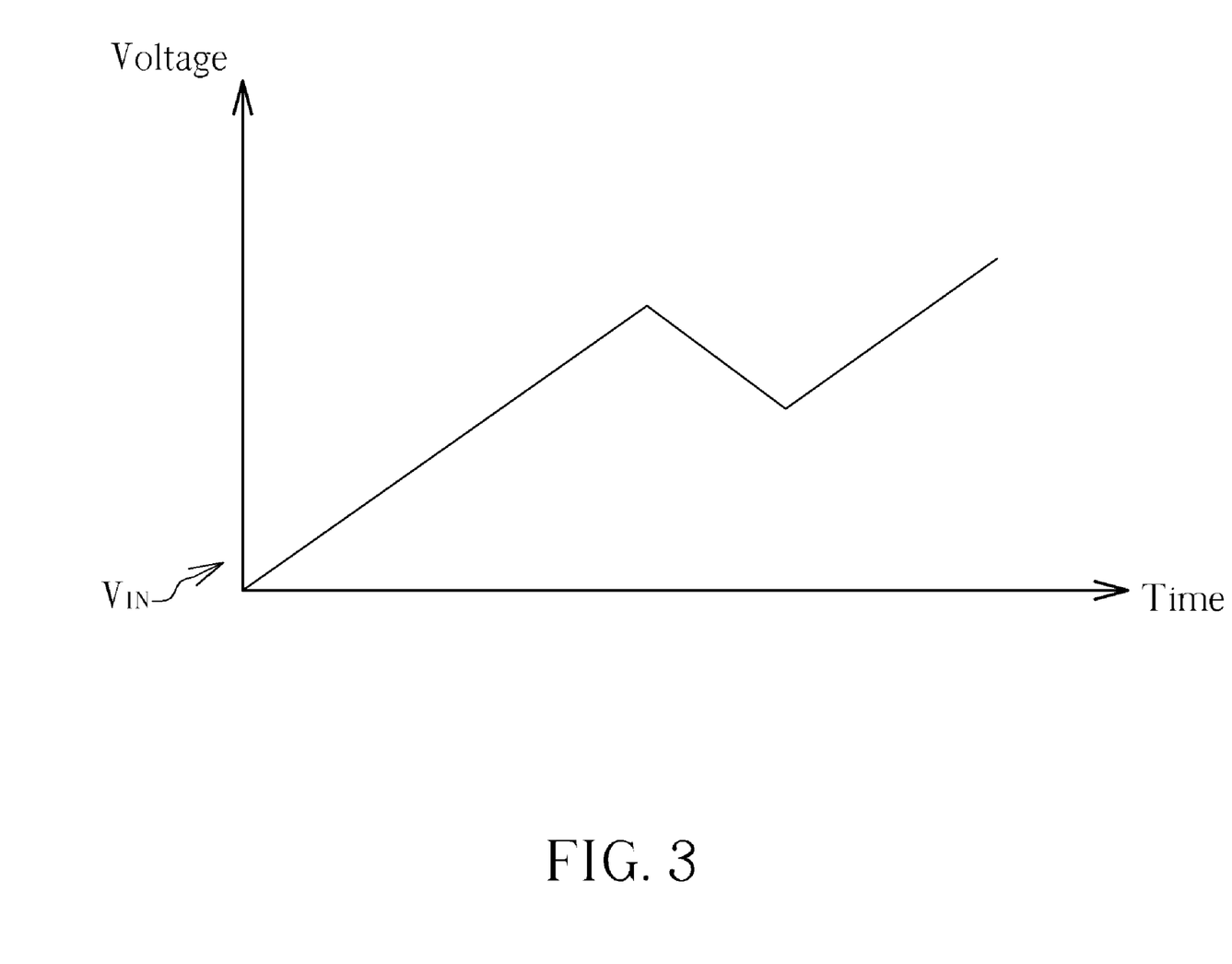
FIG. 3 is a diagram illustrating the voltage of the voltage signal source according to a second embodiment of the present invention.

Please refer to FIG. 3. FIG. 3 is a diagram illustrating the voltage $V_{IN}$ of the voltage signal source 120 according to a second embodiment of the present invention. As shown in FIG. 3, the voltage $V_{IN}$ from the voltage signal source 120, can be directly adjusted for adjusting the brightness of the LED series X. When the voltage $V_{IN}$ is lower, the brightness of the LED series X is lower. When the voltage $V_{IN}$ is higher, the brightness of the LED series X is higher. In this way, the brightness of the LED series X is effectively controlled.

Additionally, the voltage $V_{IN}$ from the voltage signal source 120 can be adjusted by combining the methods disclosed in FIG. 2 and FIG. 3. That is, the voltage $V_{IN}$ can be adjusted by mainly adjusting the duty ratio and slightly adjusting the amplitude of the voltage $V_{IN}$ for effectively controlling the brightness of the LED series X.

Figure 4:
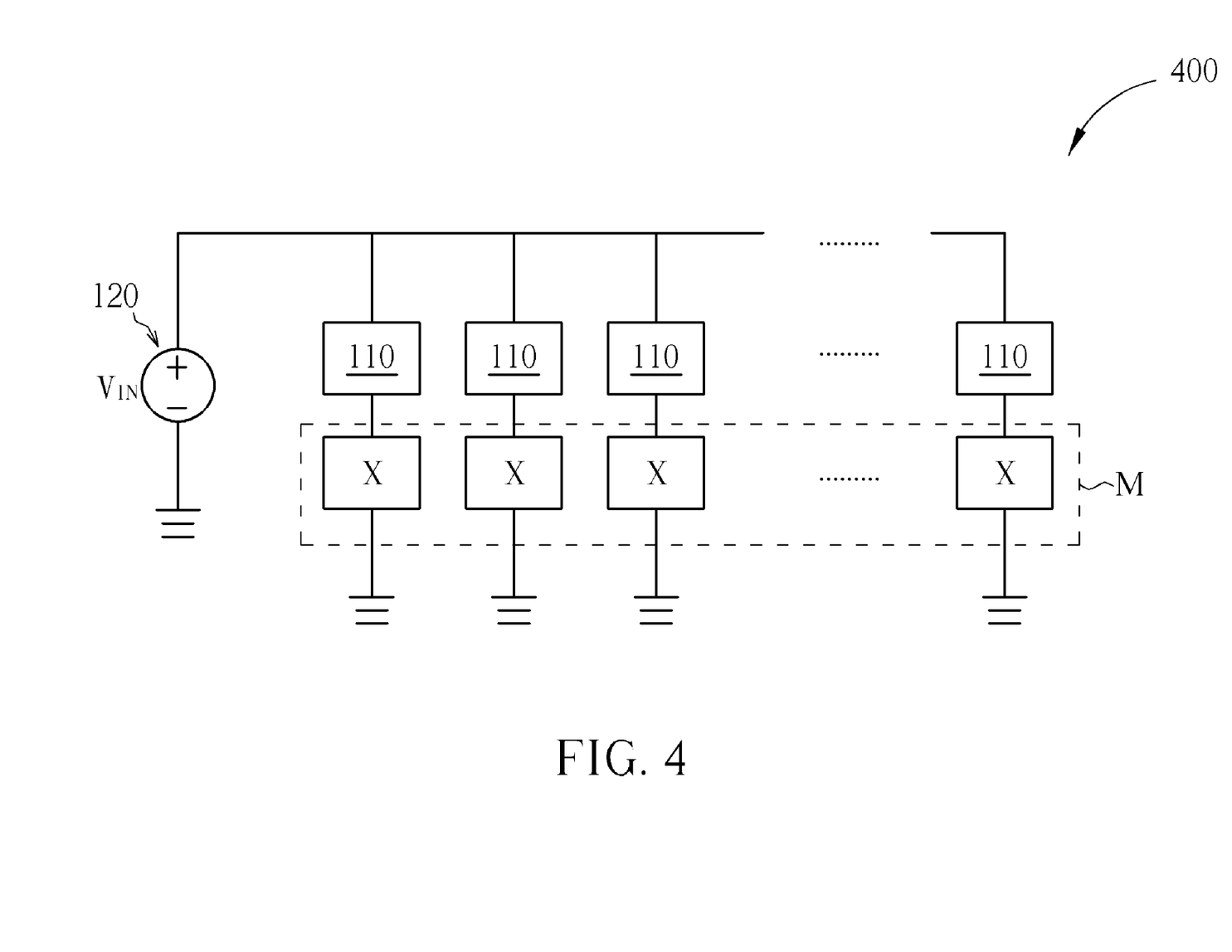
FIG. 4 is a diagram illustrating a light source driving module according to the first embodiment of the present invention.

Please refer to FIG. 4. FIG. 4 is a diagram illustrating a light source driving module 400 according to the first embodiment of the present invention. As shown in FIG. 4, the light source driving module 400 comprises a voltage signal source 120 and a plurality of voltage-controlled current sources 110 for driving an LED array M. The LED array comprises a plurality of LED series X. The voltage signal source 120 is electrically connected to the positive input end of the amplifier $Amp_1$ of each voltage-controlled current source 110 (as shown in FIG. 1 and the related description). The collector of the BJT $Q_2$ of each voltage-controlled current source 110 is electrically connected to the corresponding LED series X (as shown in FIG. 1 and the related description). The voltage signal source 120 outputs the voltage $V_{IN}$ for controlling the current output from each voltage-controlled current source 110. In this way, the current output from each voltage-controlled current source 110 is the same as the others so that each LED series X of the LED array M has the same brightness as the others. Therefore, the brightness of the entire LED array M is even.

Figure 5:
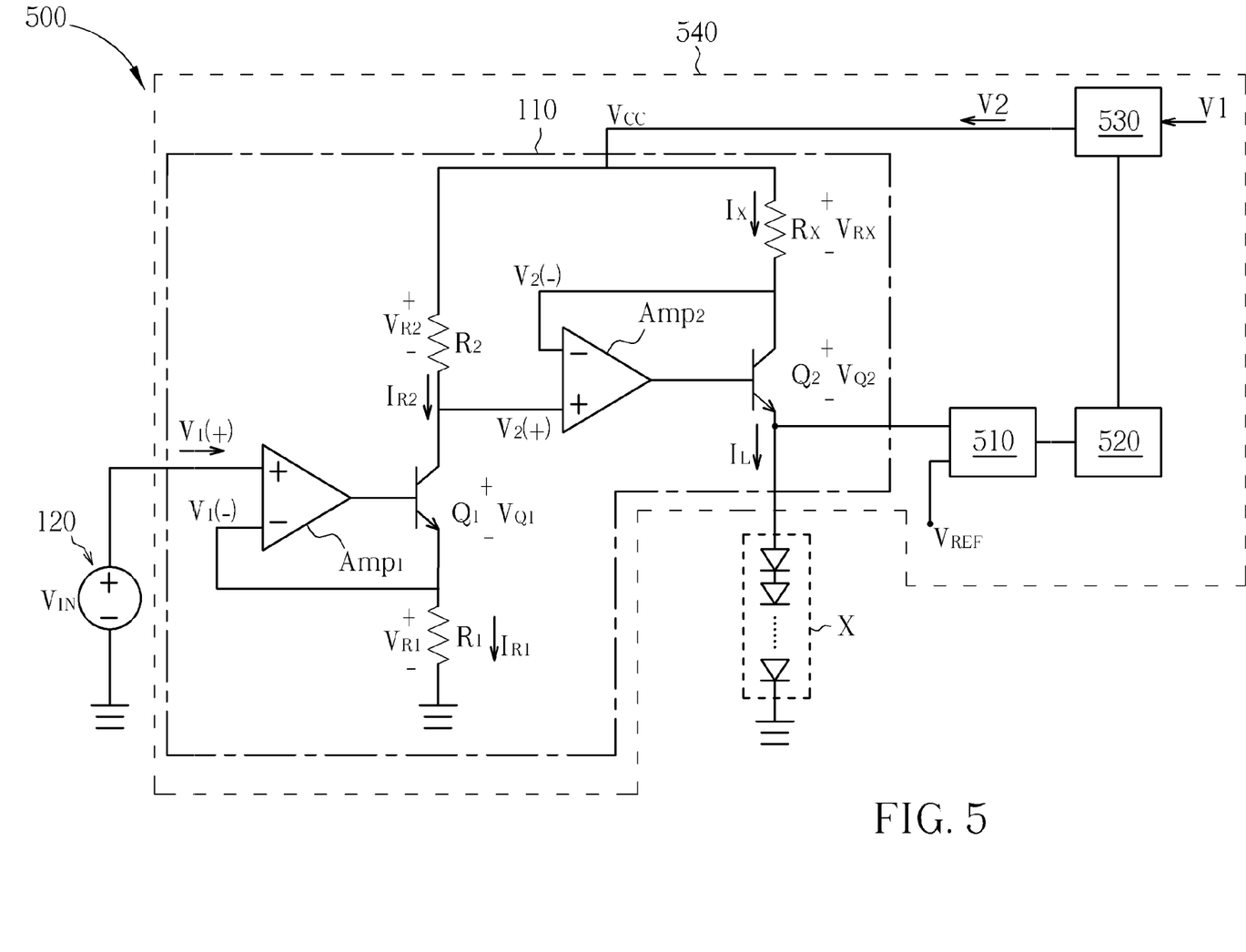
FIG. 5 is a diagram illustrating a light source driving circuit according to a second embodiment of the present invention.

Please refer to FIG. 5. FIG. 5 is a diagram illustrating a light source driving circuit 500 according to a second embodiment of the present invention. As shown in FIG. 5, the light source driving circuit 500 comprises a voltage signal source 120 and a current source 540 with improvement for the effect of the temperature. The current source 540 comprises a voltage-controlled current source 110, a feedback circuit 510, a compensation circuit 520, and a DC/DC converter 530. Operation of the voltage signal source 120 and the voltage-controlled current source 110 are the same as in the related description for FIG. 1 and are omitted. The difference between FIG. 5 and FIG. 1 is that in FIG. 5, the feedback circuit 510, the compensation circuit 520, and the DC/DC converter 530 are added. In FIG. 1, it is assumed that the voltage $V_{CC}$ from the voltage source $V_{CC}$ is fixed. However, in FIG. 5, the voltage $V_{CC}$ is decided by the voltage $V_2$ outputted from the DC/DC converter 530. Therefore, the voltage $V_{CC}$ in FIG. 5 is adjustable by controlling the output voltage $V_2$ of the DC/DC converter 530. When the temperature of the LED series X rises, the total forward voltage falls. According to FIG. 1, it is known that $V_{CC}=V_{IN}+V_{Q2}+V_{LED}$ ($V_{Q2}$ represents the voltage across the BJT $Q_2$, and $V_{LED}$ represents the total forward voltage of the LED series X). When the total forward voltage $V_{LED}$ falls, if the voltage $V_{CC}$ is fixed, the voltage across the BJT $Q_2$ rises. In this way, the power consumed by the BJT $Q_2$ rises, which generates more heat. Consequently the temperature of the BJT $Q_2$ rises, which affects the temperature of the LED series X, and therefore the temperature of the LED series X is further raised, which lowers the total forward voltage $V_{LED}$ again. In such a vicious circle, the temperature of the LED series X keeps rising. Thus, in the light source driving circuit 500, the voltage source $V_{CC}$ is designed to be adjustable. When the total forward voltage $V_{LED}$ falls, the voltage $V_{CC}$ falls with the same amplitude as the total forward voltage $V_{LED}$. In this way, the voltage across the BJT $Q_2$ is not increased, the temperature is not raised by the contribution of the BJT $Q_2$, and the effect of the temperature is improved.

Please continue referring to FIG. 5. The feedback circuit 510 can be an error amplifier, which comprises two input ends and an output end. One input end of the error amplifier is electrically connected to one end of the LED series X for receiving the total forward voltage $V_{LED}$, the other input end of the error amplifier receives a reference voltage $V_{REF}$, and the output end of the error amplifier is directly electrically connected to the control end of the DC/DC converter 530 for controlling the output voltage $V_2$. In this embodiment, the error amplifier is electrically connected to the DC/DC converter 530 through a compensation circuit 520. When the total forward voltage $V_{LED}$ is higher than the reference voltage $V_{REF}$, the error amplifier transmits a signal with a first predetermined value to the DC/DC converter 530 for raising the output voltage $V_2$. When the total forward voltage $V_{LED}$ is lower than the reference voltage $V_{REF}$, the error amplifier transmits the signal with a second predetermined value to the DC/DC converter 530 for lowering the output voltage $V_2$. The compensation circuit 520 is disposed for adjusting the values of the first and the second predetermined values within the acceptable range of the DC/DC converter 530.

The DC/DC converter 530 can be a switching regulator for receiving a voltage $V_1$, converting the voltage $V_1$, and outputting a voltage $V_2$. The voltage $V_2$ is adjusted according to the duty ratio of the switch of the DC/DC converter 530. That is, the voltage $V_2$ is adjusted according to the "ON" state of the switch of the DC/DC converter 530. When the duty ratio of the "ON" state of the switch of the DC/DC converter 530 is higher, the voltage $V_2$ is higher. When the duty ratio of the "ON" state of the switch of the DC/DC converter 530 is lower, the voltage $V_2$ is lower. More particularly, the first and the second predetermined values transmitted from the error amplifier control the duty ratio of the "ON" state of the switch of the DC/DC converter for adjusting the voltage $V_2$ (the voltage $V_{CC}$).

Figure 6:
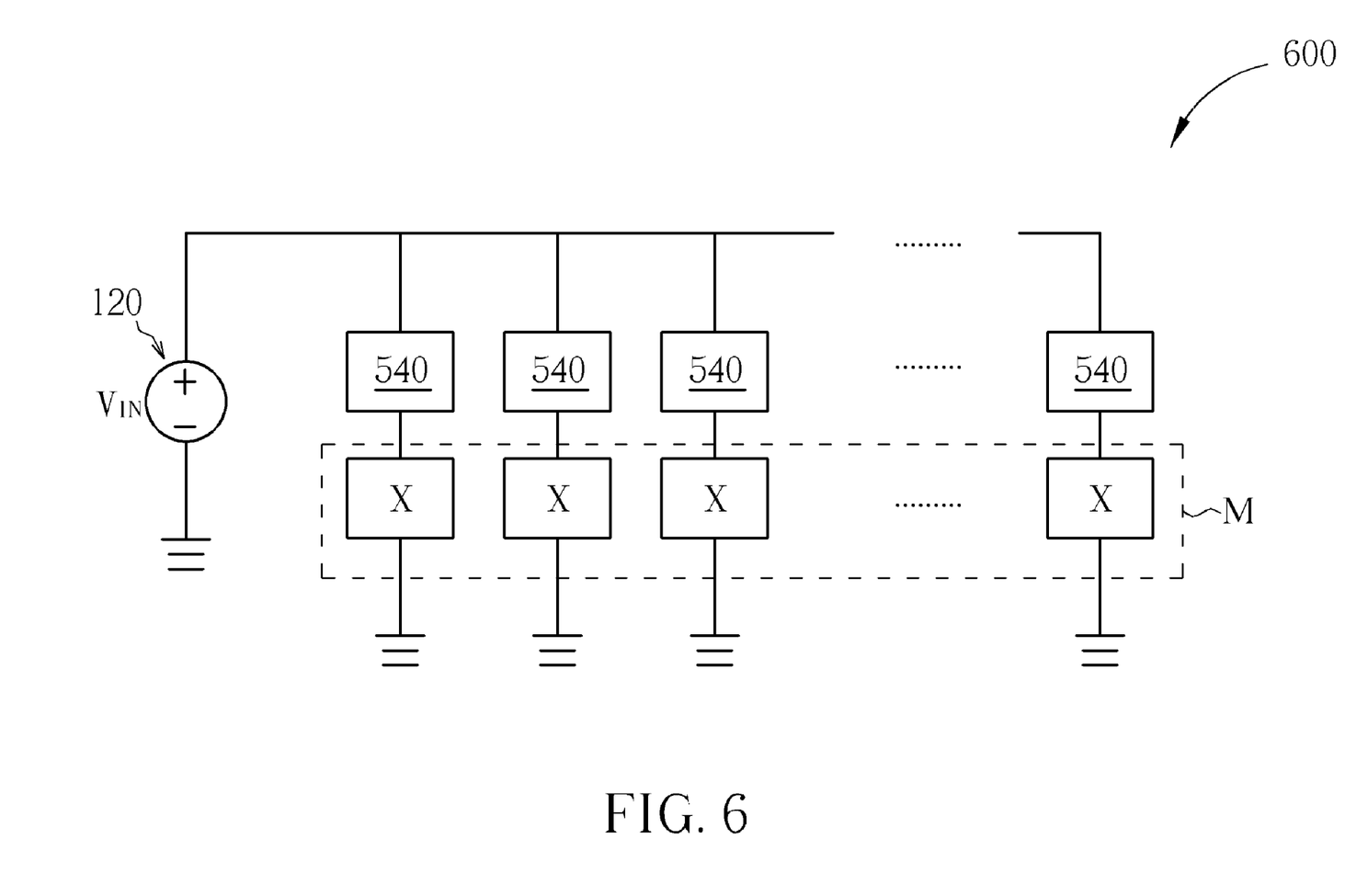
FIG. 6 is a diagram illustrating a light source driving module according to the second embodiment of the present invention.

Please refer to FIG. 6. FIG. 6 is a diagram illustrating a light source driving module 600 according to the second embodiment of the present invention. As shown in FIG. 6, the light source driving module 600 comprises a voltage signal source 120 and a plurality of current sources 540 with improvement of the effect of the temperature for driving an LED array M. The LED array M comprises a plurality of LED series X. The voltage signal source 120 is electrically connected to the positive input end of the amplifier $Amp_1$ of each current source 540 (as shown in FIG. 1 and the related description). The collector of the BJT $Q_2$ of each current source 540 is electrically connected to the corresponding LED series X (as shown in FIG. 1 and the related description). The voltage signal source 120 outputs the voltage $V_{IN}$ for controlling the current output from each current source 540. In this way, the current output from each current source 540 is the same as the others, so that each LED series X of the LED array M has the same brightness as the others. Therefore, the brightness of the entire LED array M is even, and also the influence of the temperature is reduced.

To sum up, the light source driving circuit and the light source driving module provided by the present invention not only solves the problem of uneven brightness of an LED array, but also reduces the influence of temperature variation on the forward voltage of the LED array.

Those skilled in the art will readily observe that numerous modifications and alterations of the device and method may be made while retaining the teachings of the invention.

What is claimed is:

1. A light source driving circuit for driving a series of Light Emitting Diodes (LEDs), a first end of the series of LEDs electrically connected to a ground end, the light source driving circuit comprising:
    a voltage signal source;
    a voltage-controlled current source comprising:
        a first amplifier comprising:
            a positive input end, electrically connected to the voltage signal source;
            a negative input end; and
            an output end;
        a first Bipolar Junction Transistor (BJT), comprising:
            an emitter, electrically connected to the negative input end of the first amplifier;
            a base, electrically connected to the output end of the first amplifier; and
            a collector;
        a first resistor, electrically connected between the negative input end of the first amplifier and the ground end;
        a second amplifier comprising:
            a positive input end, electrically connected to the collector of the first BJT;
            a negative input end; and
            an output end;
        a second resistor, electrically connected between the collector of the first BJT and a biasing source;
        a third resistor, electrically connected between the negative input end of the second amplifier and the biasing source; and
        a second BJT comprising:
            an emitter, electrically connected to the negative end of the second amplifier;
            a base, electrically connected to the output end of the second amplifier; and
            a collector, electrically connected to a second end of the series of LEDs.

2. The light source driving circuit of claim 1, wherein the first resistor and the second resistor have similar resistance.

3. The light source driving circuit of claim 1, wherein the series of LEDs comprises a plurality of LEDs electrically connected in series.

4. The light source driving circuit of claim 1, wherein the voltage signal source is a voltage signal source generating a pulse signal with adjustable width, or a voltage signal source generating a signal with adjustable voltage.

5. A light source driving module for driving an array of LEDs, the array of LEDs having K series of LEDs, K being a positive integer, a first end of each series of LEDs being electrically connected to a ground end, the light source driving module comprising:
    a voltage signal source;
    K voltage-controlled current sources, each of the K voltage-controlled current sources comprising:
        a first amplifier comprising:
            a positive input end, electrically connected to the voltage signal source;
            a negative input end; and
            an output end;
        a first BJT comprising:
            an emitter, electrically connected to the negative input end of the first amplifier;
            a base, electrically connected to the output end of the first amplifier; and
            a collector;
        a first resistor, electrically connected between the negative end of the first amplifier and the ground end;
        a second amplifier comprising:
            a positive input end, electrically connected to the collector of the first BJT;
            a negative input end; and
            an output end;
        a second resistor, electrically connected between the collector of the first BJT and a biasing source;
        a third resistor, electrically connected between the negative input end of the second amplifier and the biasing source; and
        a second BJT comprising:
            an emitter, electrically connected to the negative input end of the second amplifier;
            a base, electrically connected to the output end of the second amplifier; and
            a collector, electrically connected to a second end of a corresponding series of the LEDs.

6. The light source driving module of claim 5, wherein the first resistor and the second resistor have similar resistance.

7. The light source driving module of claim 5, wherein each series of LEDs comprises a plurality of LEDs electrically connected in series.

8. The light source driving module of claim 5, wherein the voltage signal source is a voltage signal source generating a pulse signal with adjustable width, or a voltage signal source generating a signal with adjustable voltage.

9. A light source driving circuit for driving a series of LEDs, a first end of the series of LEDs electrically connected to a ground end, the light source driving circuit comprising:
   a voltage signal source;
   a current source comprising:
     an adjustable biasing source;
     a voltage-controlled current source, comprising:
       a first amplifier comprising:
         a positive input end, electrically connected to the voltage signal source;
         a negative input end; and
         an output end;
       a first BJT comprising:
         an emitter, electrically connected to the negative input end of the first amplifier;
         a base, electrically connected to the output end of the first amplifier; and
         a collector;
       a first resistor, electrically connected between the negative input end of the first amplifier and the ground end;
       a second amplifier comprising:
         a positive input end, electrically connected to the collector of the first BJT;
         a negative input end; and
         an output end;
       a second resistor, electrically connected between the collector of the first BJT and the adjustable biasing source;
       a third resistor, electrically connected between the negative input end of the second amplifier and the adjustable biasing source;
       a second BJT comprising:
         an emitter, electrically connected to the negative input end of the second amplifier;
         a base, electrically connected to the output end of the second amplifier; and
         a collector, electrically connected to a second end of the series of the LEDs; and
   a feedback circuit, electrically connected between the second end of the series of the LEDs and the adjustable biasing source for controlling level of an output voltage of the adjustable biasing source according to a voltage on the second end of the series of LEDs.

10. The light source driving circuit of claim 9, wherein the feedback circuit raises the output voltage of the adjustable biasing source when the voltage on the second end of the series of LEDs falls.

11. The light source driving circuit of claim 10, wherein the adjustable biasing source is a DC/DC converter for receiving a first voltage and converting the first voltage to a second voltage, and level of the second voltage is controlled by the feedback circuit.

12. The light source driving circuit of claim 11, wherein the DC/DC converter is a switching regulator.

13. The light source driving circuit of claim 9, wherein the feedback circuit comprises an error amplifier, the error amplifier comprising:
   a first input end, electrically connected to the second end of the series of LEDs;
   a second input end for receiving a reference voltage; and
   an output end, electrically connected to the adjustable biasing source for outputting a first predetermined voltage or a second predetermined voltage according to voltage on the first input end of the error amplifier and voltage on the second input end of the error amplifier.

14. The light source driving circuit of claim 13, further comprising a compensation circuit, electrically connected between the error amplifier and the adjustable biasing source, for adjusting the first predetermined voltage and the second predetermined voltage to an acceptable range of the adjustable biasing source.

15. The light source driving circuit of claim 9, wherein the first resistor and the second resistor have similar resistance.

16. The light source driving circuit of claim 9, wherein the series of LEDs comprises a plurality of LEDs electrically connected in series.

17. The light source driving circuit of claim 9, wherein the voltage signal source is a voltage signal source generating a pulse signal with adjustable width, or a voltage signal source generating a signal with adjustable voltage.

18. A light source driving module for driving an array of LEDs, the array of LEDs having K series of LEDs, K being a positive integer, a first end of each series of the LEDs being electrically connected to a ground end, the light source driving module comprising:
   a voltage signal source;
   K current sources, each of the K current sources comprising:
     an adjustable biasing source;
     a voltage-controlled current source comprising:
       a first amplifier comprising:
         a positive input end, electrically connected to the voltage signal source;
         a negative input end; and
         an output end;
       a first BJT comprising:
         an emitter, electrically connected to the negative input end of the first amplifier;
         a base, electrically connected to the output end of the first amplifier; and
         a collector;
       a first resistor, electrically connected between the negative input end of the first amplifier and the ground end;
       a second amplifier comprising:
         a positive input end, electrically connected to the collector of the first BJT;
         a negative input end; and
         an output end;
       a second resistor, electrically connected between the collector of the first BJT and the adjustable biasing source;
       a third resistor, electrically connected between the negative input end of the second amplifier and the adjustable biasing source;
       a second BJT comprising:
         an emitter, electrically connected to the negative input end of the second amplifier;
         a base, electrically connected to the output end of the second amplifier; and
         a collector, electrically connected to a second end of the corresponding series of the LEDs; and
   a feedback circuit, electrically connected between the second end of the corresponding series of the LEDs and the adjustable biasing source for controlling level of an output voltage of the adjustable biasing source according to a voltage on the second end of the corresponding series of LEDs.

19. The light source driving module of claim 18, wherein the feedback circuit raises the output voltage of the adjustable biasing source when the voltage on the second end of the corresponding series of LEDs falls.

20. The light source driving module of claim 18, wherein the adjustable biasing source is a DC/DC converter for receiving a first voltage and converting the first voltage to a second voltage, and level of the second voltage is controlled by the feedback circuit.

21. The light source driving module of claim 20, wherein the DC/DC converter is a switching regulator.

22. The light source driving module of claim 18, wherein the feedback circuit comprises an error amplifier, the error amplifier comprising:
- a first input end, electrically connected to the second end of the series of the LEDs;
- a second input end for receiving a reference voltage; and
- an output end, electrically connected to the adjustable biasing source for outputting a first predetermined voltage or a second predetermined voltage according to voltage on the first input end of the error amplifier and voltage on the second input end of the error amplifier.

23. The light source driving module of claim 22, further comprising a compensation circuit, electrically connected between the error amplifier and the adjustable biasing source, for adjusting the first predetermined voltage and the second predetermined voltage to an acceptable range of the adjustable biasing source.

24. The light source driving module of claim 18, wherein the first resistor and the second resistor have similar resistance.

25. The light source driving module of claim 18, wherein each series of LEDs comprises a plurality of LEDs electrically connected in series.

26. The light source driving module of claim 18, wherein the voltage signal source is a voltage signal source generating a pulse signal with adjustable width, or a voltage signal source generating a signal with adjustable voltage.

* * * * *